(12) United States Patent
Chen et al.

(10) Patent No.: US 11,938,508 B2
(45) Date of Patent: *Mar. 26, 2024

(54) GLUE DISPENSER DISPENSING SWITCH AND DOUBLE LIQUID DISPENSING EQUIPMENT WITH THE SAME

(71) Applicant: Kulicke and Soffa Hi-Tech Co., Ltd., New Taipei (TW)

(72) Inventors: Lu-Min Chen, Taipei (TW); Mu-Huang Liu, Taipei (TW); Tsung-Lin Tsai, Taipei (TW)

(73) Assignee: Kulicke and Soffa Hi-Tech Co., Ltd. (TW)

( * ) Notice: Subject to any disclaimer, the term of this patent is extended or adjusted under 35 U.S.C. 154(b) by 376 days.

This patent is subject to a terminal disclaimer.

(21) Appl. No.: 17/444,667

(22) Filed: Aug. 8, 2021

(65) Prior Publication Data

US 2022/0331831 A1 Oct. 20, 2022

(30) Foreign Application Priority Data

Apr. 15, 2021 (TW) ................................. 110204129

(51) Int. Cl.
*B05C 5/02* (2006.01)
(52) U.S. Cl.
CPC .................................. *B05C 5/0208* (2013.01)
(58) Field of Classification Search
CPC .................................................... B05C 5/0208
USPC ........................................................ 222/167
See application file for complete search history.

(56) References Cited

U.S. PATENT DOCUMENTS

| | | | | |
|---|---|---|---|---|
| 3,462,128 A | * | 8/1969 | Dufour | B29B 7/407 222/137 |
| 4,477,191 A | * | 10/1984 | Ersfeld | B29B 7/7673 222/137 |
| 4,740,089 A | * | 4/1988 | Fiorentini | B29B 7/7668 366/159.1 |
| 6,637,625 B1 | * | 10/2003 | Jefferson | G01F 11/029 222/255 |
| 11,731,159 B2 | * | 8/2023 | Chen | B05C 5/0229 156/538 |

(Continued)

FOREIGN PATENT DOCUMENTS

WO WO-9906196 A1 * 2/1999 ........... B29B 7/7678
WO WO-2020092060 A1 * 5/2020 ........... B32B 17/061

*Primary Examiner* — Paul R Durand
*Assistant Examiner* — Michael J. Melaragno
(74) *Attorney, Agent, or Firm* — Christopher M. Spletzer, Sr.

(57) ABSTRACT

A glue dispenser dispensing switch includes a switching device main body, a needle holding base, a wear-resistant plate, and a rotating device. The switching device main body is equipped with a double liquid inlet, the needle holding base is equipped with a mixed glue outlet, the wear-resistant plate is installed between the switching device main body and the needle holding base, and the wear-resistant plate is equipped with a wear-resistant plate opening. The rotating device is utilized to rotate the needle holding base or the wear-resistant plate. A mixed double-liquid glue passes through the double liquid inlet, the wear-resistant plate opening and the glue outlet to dispense a mixed glue while the double liquid inlet, the wear-resistant plate opening and the glue outlet are overlapped. In addition, a double liquid dispensing equipment is also disclosed herein.

16 Claims, 5 Drawing Sheets

(56) References Cited

U.S. PATENT DOCUMENTS

2009/0220385 A1* 9/2009 Brown ............... G01N 35/1065
422/400
2022/0331831 A1* 10/2022 Chen ................... B05C 11/1034
2023/0311154 A1* 10/2023 Chen ..................... B05C 5/0225
222/1

* cited by examiner

GLUE DISPENSER DISPENSING SWITCH AND DOUBLE LIQUID DISPENSING EQUIPMENT WITH THE SAME

RELATED APPLICATIONS

This application claims priority to Taiwan Application Serial Number 110204129, filed Apr. 15, 2021, the disclosures of which are incorporated herein by reference in their entireties.

TECHNICAL FIELD

The present disclosure generally relates to a glue dispenser dispensing switch. More particularly, the present disclosure relates to a double liquid dispensing equipment with a glue dispenser dispensing switch.

BACKGROUND

With the development of science and technology, electronic products have become thinner and lighter, and their precision has become higher. The automatic glue dispenser is an automated equipment developed for the packaging industry, which can package the workpiece by controlling the glue to coat the workpiece. The glue dispenser is also called a coating machine, a glue potting machine and so on. With the industrialization development, the automatic glue dispenser can reduce the demand for human resources, thereby alleviating the shortage of human resources required to manufacture the electronic devices.

The glue dispensing technology has to be more precisely conducted because the development of the thinner display modules and the narrower frame thereof. A precise glue dispensing technology is not only applied to the display module industry, but also applied to various products that need to be bonded. With the improvement of the accuracy of glue dispensing technology, the current application fields are becoming more and more extensively. Although, at this time, the glue dispensers have been widely used in various industries, and are indispensable packaging equipment in the electronics industry. However, because the electronic products are becoming more and more sophisticated, display screens are getting bigger and bigger, and the size of the display frame is getting narrower and narrower, the improvement of the accuracy and reliability of the glue dispenser can further improve the glue dispenser to extend the application scope and the application industry of the glue dispenser.

The stability of the glue dispenser can effectively improve the quality of the electronic products. Therefore, how to improve the accuracy and reliability of the glue dispenser can effectively improve the various production accuracy and reduce production costs thereof and especially for improving the accuracy of the precision electronic products.

SUMMARY

One objective of the embodiments of the present invention is to provide a glue dispenser able to precisely and stably dispense glues.

To achieve these and other advantages and in accordance with the objective of the embodiments of the present invention, as the embodiment broadly describes herein, the embodiments of the present invention provides a glue dispenser dispensing switch including a switching device main body, a needle holding base, a wear-resistant plate and a rotating device. The switching device main body is equipped with a double liquid inlet, the needle holding base is equipped with a mixed glue outlet, the wear-resistant plate is installed between the switching device main body and the needle holding base, and the wear-resistant plate is equipped with a wear-resistant plate opening. The rotating device is configured to rotate the needle holding base or the wear-resistant plate, wherein a mixed double-liquid glue is passed through the double liquid inlet, the wear-resistant plate opening and the mixed glue outlet to dispense the mixed double-liquid glue when the double liquid inlet, the mixed glue outlet and the wear-resistant plate opening are overlapped.

In some embodiments, the glue dispenser dispensing switch further includes a needle configured to install on the mixed glue outlet of the needle holding base.

In some embodiments, the glue dispenser dispensing switch further includes a rotating shaft connecting to the rotating device and the needle holding base.

In some embodiments, the glue dispenser dispensing switch further includes a rotating shaft connecting to the rotating device, the wear-resistant plate and the needle holding base.

In some embodiments, the glue dispenser dispensing switch further includes a rotating shaft connecting to the rotating device and the wear-resistant plate.

In some embodiments, the glue dispenser dispensing switch further includes a positioning device equipped in the switching device main body to position the needle holding base.

In some embodiments, the wear-resistant plate includes a Teflon wear-resistant plate.

In addition, according to another aspect of the present invention, the embodiments of the present invention provide a double liquid dispensing equipment. The double liquid dispensing equipment includes the foregoing glue dispenser dispensing switch and a mixing tube connecting to the double liquid inlet of the glue dispenser dispensing switch.

In some embodiments, the double liquid dispensing equipment further includes a double liquid valve connecting to the mixing tube. The double liquid valve includes a first liquid supply valve and a second liquid supply valve.

Hence, the glue dispenser dispensing switch of the present invention can accurately dispense the glue for the electronic device, and avoid the pressure influencing on the glue while the dispensing switch rotating, thereby effectively improving the glue uniformity and stability in the dispensing process.

BRIEF DESCRIPTION OF THE DRAWINGS

The foregoing aspects and many of the attendant advantages of this invention will be more readily appreciated as the same becomes better understood by reference to the following detailed description, when taken in conjunction with the accompanying drawings, wherein.

DETAILED DESCRIPTION OF THE PREFERRED EMBODIMENT

The following description is of the best presently contemplated mode of carrying out the present disclosure. This description is not to be taken in a limiting sense but is made merely for the purpose of describing the general principles of the invention. The scope of the invention should be determined by referencing the appended claims.

Figure 1:
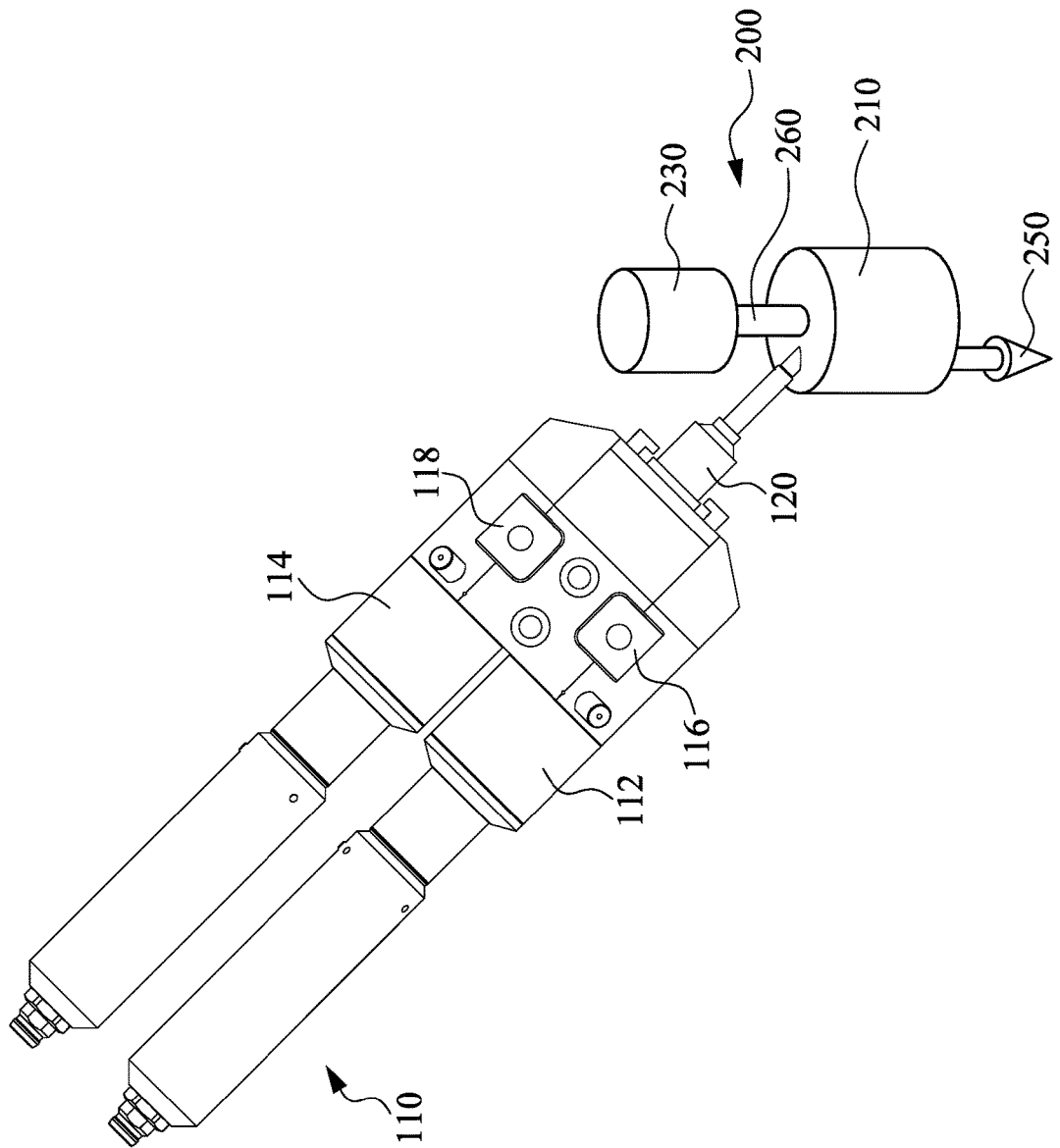
FIG. 1 illustrates a schematic perspective view showing a double liquid dispensing equipment according to one embodiment of the present invention.
Figure 2:
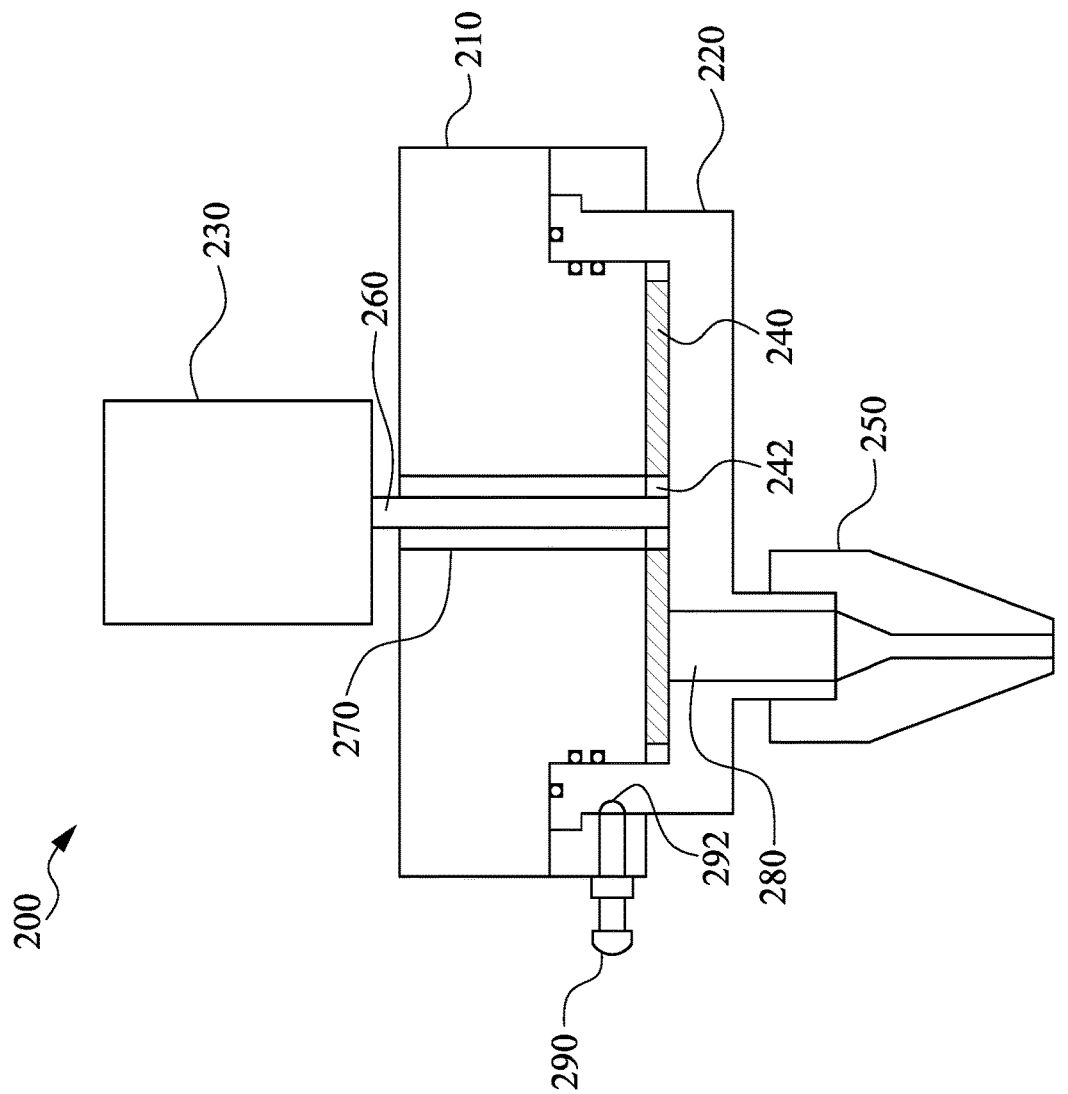
FIG. 2 illustrates a schematic side view showing a double liquid dispensing equipment according to one embodiment of the present invention.
Figure 3:
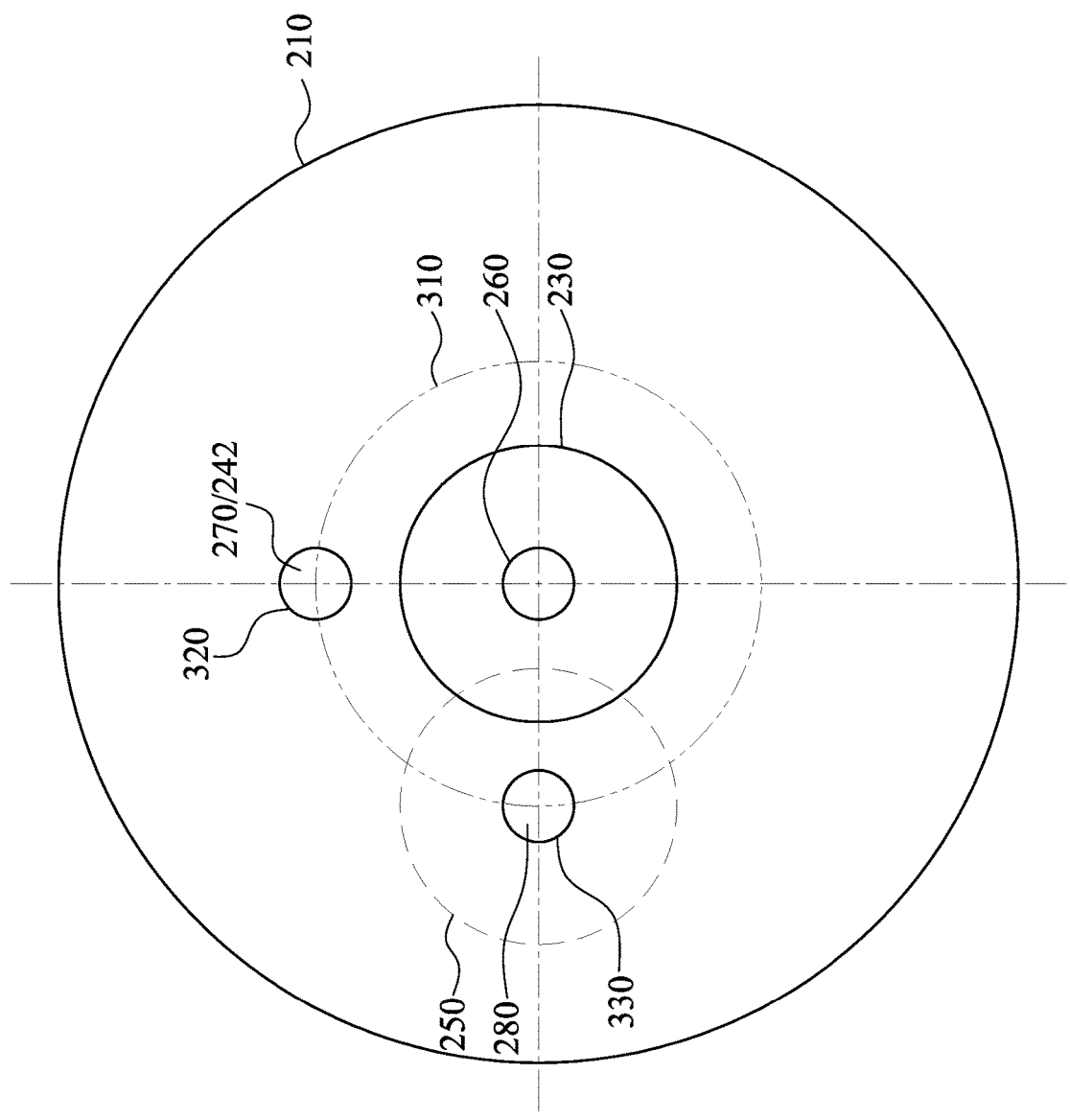
FIG. 3 illustrates a schematic top view showing a double liquid dispensing equipment according to one embodiment of the present invention.
Figure 4:
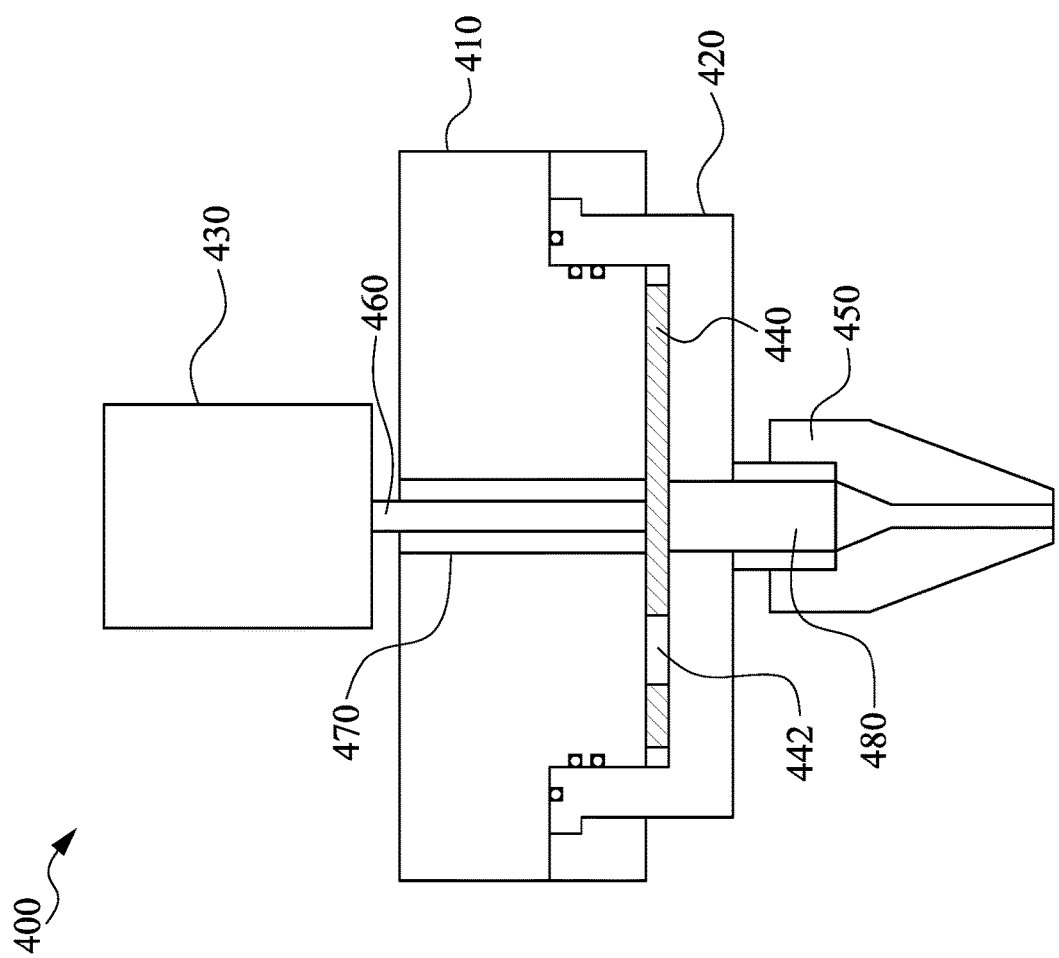
FIG. 4 illustrates a schematic side view showing a double liquid dispensing equipment according to another embodiment of the present invention.
Figure 5:
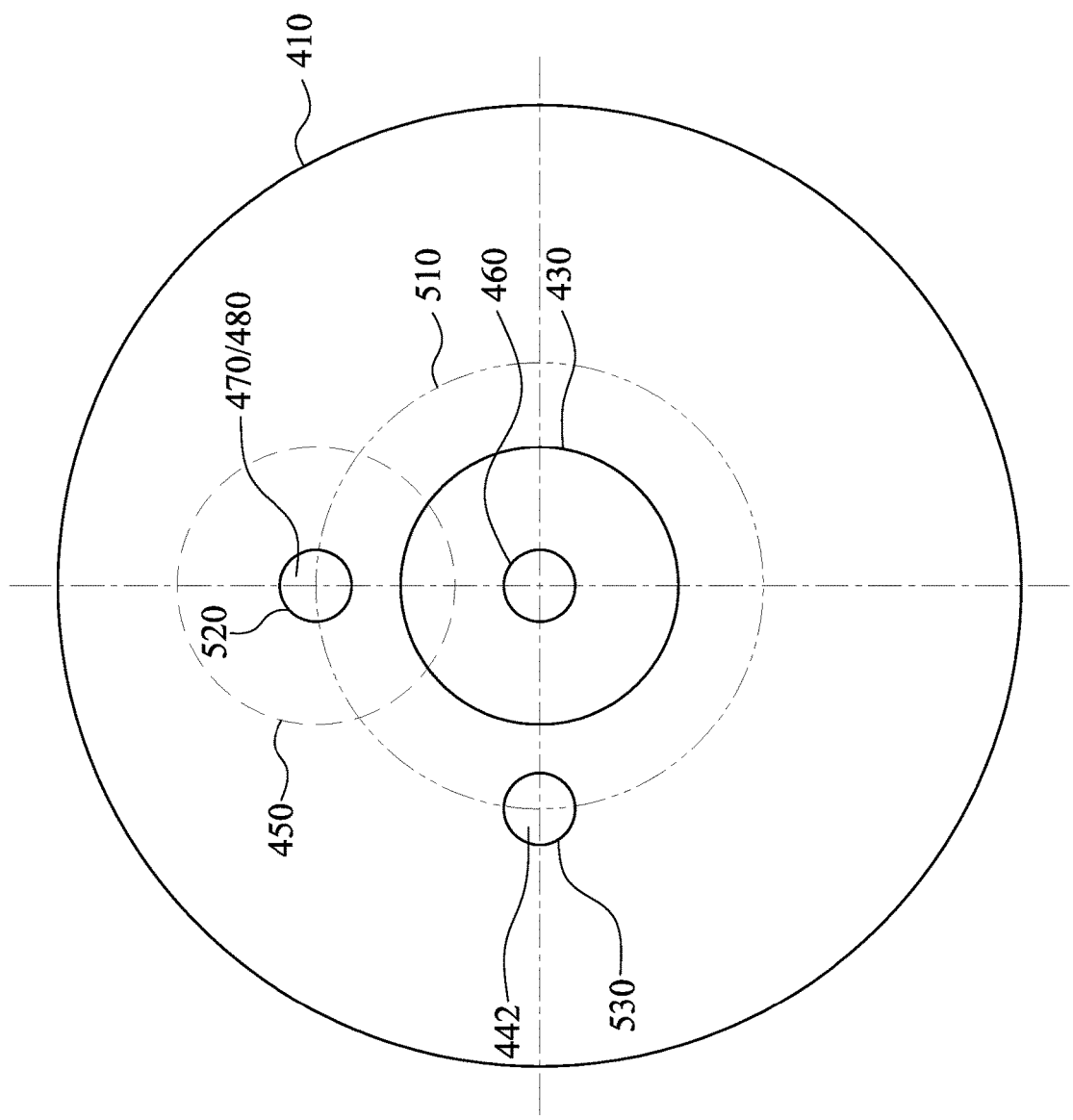
FIG. 5 illustrates a schematic top view showing a double liquid dispensing equipment according to another embodiment of the present invention.

FIG. 1 is a schematic perspective view showing a double liquid dispensing equipment according to one embodiment of the present invention, FIG. 2 is a schematic side view thereof and FIG. 3 is a schematic top view thereof. FIG. 4 is a schematic side view showing a double liquid dispensing equipment according to another embodiment of the present invention and FIG. 5 is a schematic top view thereof.

Referring to FIG. 1, a double liquid dispensing equipment 100 includes a double liquid valve 110, a mixing tube 120 and a glue dispenser dispensing switch 200.

The double liquid valve 110 includes a first liquid supply valve 112 and a second liquid supply valve 114 to provide a main agent and a hardener respectively, and mix the same in the mixing tube 120.

The main agent and the hardener are supplied from a first liquid inlet 116 of the first liquid supply valve 112 and a second liquid inlet 118 of the second liquid supply valve 114 into the first liquid supply valve 112 and the second liquid supply valve 114, and the main agent and the hardener are further delivered to the mixing tube 120 with the rotor and the stator of the first liquid supply valve 112 and the second liquid supply valve 114. In addition, the double liquid valve 110 can also be two single liquid valves without departing from the scope and the spirit of the present invention.

In addition, the main agent can be a glue such as epoxy resin, polyurethane, silicone, etc., and mixed with the hardener in a predetermined ratio, for example, mixed in a ratio of 10:1, but the present invention is not limited thereto. In addition, the main agent and the hardener can be properly mixed according to selected main agent and hardener.

In some embodiments, the first liquid supply valve 112 and the second liquid supply valve 114 can be micro screw valves, e.g. a Mono pump, which has a stator with a double-ended spiral elastic cavity bushing to engage with the rotor, to transport the required liquid glues. When the rotor continuously rotates relative to the stator, the first liquid inlet 116 and the second liquid inlet 118 respectively sucks the main agent and the hardener and then output to the mixing tube 120 through the sealed cavity along the axial direction due to the pressure effect.

The mixing tube 120 is connected to the double liquid valve 110, preferably having a shorter length and fewer blades, to reduce the residence time of the main agent and the hardener in the mixing tube 120. In some embodiments, the mixing tube 120 has less than 12 mixing blades. In some embodiments, the mixing tube 120 may have less than 10 mixing blades to fully mix the main agent and the hardener, and reduce the residence time in the mixing tube 120. The mixing blades are preferably formed by spiral mixing blades, which have about 8 segments of 360-degree blades in series.

The main agent and the hardener are fully mixed in the mixing tube 120 and delivered to the subsequent glue dispenser dispensing switch 200 to perform the dispensing process.

A traditional double liquid dispenser uses a pin to open or close the dispenser adjacent to the needle to make the mixed glue flow out or stop. However, when the dispenser is opened or closed with the pin, the mixed glue may cause some problems such as wire drawing, glue accumulation or inconsistent thickness, whereby reducing the dispensing quality.

However, the glue dispenser dispensing switch 200 disclosed in the present invention is opened or closed by a rotary switching mechanism. Therefore, the direction of the opening and the closing force is vertical to the flow line of the mixed glue so that no pressure forced on the needle outlet while opening or closing of the glue dispenser thereby effectively improving the dispensing quality.

Referring to FIGS. 2 and 3, the glue dispenser dispensing switch 200 includes a switching device main body 210, a needle holding base 220, a wear-resistant plate 240 and a rotating device 230. The switching device main body 210 includes a double liquid inlet 270 to connect to the mixing tube 120 and receive the mixed glue. The needle holding base 220 includes a mixed glue outlet 280 to connect to the needle 250.

The wear-resistant plate 240 is installed between the switching device main body 210 and the needle holding base 220, and the wear-resistant plate 240 includes a wear-resistant plate opening 242. The rotating device 230 is connected to the needle holding base 220 and/or the wear-resistant plate 240 to rotate the needle holding base 220 and/or the wear-resistant plate 240.

When the double liquid inlet 270, the mixed glue outlet 280 and the wear-resistant plate opening 242 are overlapped, e.g. three holes are arranged in one line, but not limited to this, the mixed double-liquid glue can pass through the double liquid inlet 270, the wear-resistant plate opening 242 and the mixed glue outlet 280 to reach the needle 250 for dispensing the mixed glue.

The diameters of the double liquid inlet 270, the wear-resistant plate opening 242 and the mixed glue outlet 280 may the same or different without departing from the spirit and the scope of the invention. In addition, the flow rate of the glue dispenser dispensing switch 200 can be determined according to the size of the intersection of the three holes without departing from the spirit and the scope of the invention.

In some embodiments, the glue dispenser dispensing switch 200 further includes a rotating shaft 260 to connect the rotating device 230 and the needle holding base 220 to rotate the needle holding base 220 with the rotating device 230 and align the mixed glue outlet 280 with the double liquid inlet 270 and the wear-resistant plate opening 242.

Referring to FIG. 3, the rotating device 230 can rotate the needle holding base 220 to allow the mixed glue outlet 280 moving in the circular path 310. The mixed glue outlet 280 can move in the entire circular path 310 or a part of the circular path 310 without departing from the spirit and the scope of the invention.

In some embodiments, as shown in FIG. 3, the double liquid inlet 270 and the wear-resistant plate opening 242 are located at the first position 320, and the mixed glue outlet 280 is located at the second position 330. The rotating device 230 can rotate the needle holding base 220 to move the mixed glue outlet 280 of the needle holding base 220 and the needle 250 to the first position 320, so that the double liquid inlet 270, the wear-resistant plate opening 242 and the mixed glue outlet 280 are overlapped to enable the mixed glue to flow out from the needle 250 to inject the mixed glue to the surface of the product under glued.

In some embodiments, the glue dispenser dispensing switch 200 further includes a positioning device 290 located in the switching device main body 210. When the needle holding base 220 is rotated to a predetermined position, the positioning device 290 can engage with a recessed hole 292 of the needle holding base 220 to position the needle holding base 220 at the predetermined position of the switching device main body 210.

In some embodiments, the rotating shaft 260 is connected to the rotating device 230, the wear-resistant plate 240 and the needle holding base 220. That is to say, the wear-resistant plate 240 and the needle holding base 220 can be rotated together. At this moment, the double liquid inlet 270 is located at the first position 320, and the wear-resistant plate opening 242 and the mixed glue outlet 280 is located at the second position 330. The rotating device 230 rotates the needle holding base 220 and the wear-resistant plate 240 to move the wear-resistant plate opening 242 of the wear-resistant plate 240 and the mixed glue outlet 280 of the needle holding base 220 and the needle 250 to the first position 320, so that the double liquid inlet 270, the wear-resistant plate opening 242 and the mixed glue outlet 280 are overlapped to enable the mixed glue to flow out from the needle 250 to inject the mixed glue to the surface of the product under glued.

In some embodiments, the wear-resistant plate 240 includes a Teflon wear-resistant plate.

Further referring to FIGS. 4 and 5, FIG. 4 is illustrated a schematic side view of a double liquid dispensing equipment according to another embodiment of the present invention and FIG. 5 is a schematic top view thereof. The glue dispenser dispensing switch 400 includes a switching device main body 410, a needle holding base 420, a wear-resistant plate 440 and a rotating device 430. The switching device main body 410 includes a double liquid inlet 470 to connect to the mixing tube 120 for receiving the mixed glue. The needle holding base 420 includes a mixed glue outlet 480 to connect to the needle 450.

The wear-resistant plate 440 is installed between the switching device main body 410 and the needle holding base 420, and the wear-resistant plate 440 includes a wear-resistant plate opening 442. The rotating device 430 is connected to the wear-resistant plate 440 to rotate the wear-resistant plate 440.

When the double liquid inlet 470, the wear-resistant plate opening 442 and the mixed glue outlet 480 are overlapped, the mixed double-liquid glue can flow through the double liquid inlet 470, the wear-resistant plate opening 442 and the mixed glue outlet 480 to dispense the mixed glue through the needle 450.

The diameters of the double liquid inlet 470, the wear-resistant plate opening 442 and the mixed glue outlet 480 may the same or different without departing from the spirit and the scope of the invention. In addition, the flow rate of the glue dispenser dispensing switch 400 can be determined according to the size of the intersection of the three holes without departing from the spirit and the scope of the invention.

In some embodiments, the glue dispenser dispensing switch 400 further includes a rotating shaft 460 to connect the rotating device 430 and the wear-resistant plate 440 to rotate the wear-resistant plate 440 with the rotating device 430 and align the wear-resistant plate opening 442 with the double liquid inlet 470 and the mixed glue outlet 480.

Referring to FIG. 5, the rotating device 430 can rotate the wear-resistant plate 440 to allow the wear-resistant plate 440 moving in the circular path 510. The wear-resistant plate 440 can move in the entire circular path 510 or a part of the circular path 510 without departing from the spirit and the scope of the invention.

In some embodiments, as shown in FIG. 5, the double liquid inlet 470 and the mixed glue outlet 480 are located at the first position 520, and the wear-resistant plate opening 442 is located at the second position 530. The rotating device 430 can rotate the wear-resistant plate 440 to move the wear-resistant plate opening 442 to the first position 520, so that the double liquid inlet 470, the wear-resistant plate opening 442 and the mixed glue outlet 480 are overlapped to enable the mixed glue to flow out from the needle 450 to inject the mixed glue to the surface of the product under glued. In some embodiments, the wear-resistant plate 440 includes a Teflon wear-resistant plate.

In some embodiments, the rotating device can be a pneumatic rotating device, a hydraulic rotating device and/or a motor, such as a servo motor or a stepping motor without departing from the spirit and the scope of the invention.

Accordingly, the glue dispenser dispensing switch of the present invention can accurately dispense the glue for the electronic device, and avoid the pressure influencing on the glue while the dispensing switch rotating, thereby effectively improving the glue uniformity and stability in the dispensing process.

As is understood by a person skilled in the art, the foregoing preferred embodiments of the present invention are illustrative of the present invention rather than limiting of the present invention. It is intended that various modifications and similar arrangements be included within the spirit and scope of the appended claims, the scope of which should be accorded the broadest interpretation so as to encompass all such modifications and similar structures.

What is claimed is:

1. A glue dispenser dispensing switch, comprising:
   a switching device main body equipped with a double liquid inlet;
   a needle holding base equipped with a mixed glue outlet;
   a wear-resistant plate installed between the switching device main body and the needle holding base, the wear-resistant plate equipped with a wear-resistant plate opening; and
   a rotating device configured to rotate the needle holding base or the wear-resistant plate, wherein a mixed double-liquid glue is passed through the double liquid inlet, the wear-resistant plate opening and the mixed glue outlet to dispense the mixed double-liquid glue when the double liquid inlet, the mixed glue outlet and the wear-resistant plate opening are overlapped.

2. The glue dispenser dispensing switch of claim 1, further comprising:
   a needle configured to install on the mixed glue outlet of the needle holding base.

3. The glue dispenser dispensing switch of claim 1, further comprising:
   a rotating shaft connecting to the rotating device and the needle holding base.

4. The glue dispenser dispensing switch of claim 1, further comprising:
   a rotating shaft connecting to the rotating device, the wear-resistant plate and the needle holding base.

5. The glue dispenser dispensing switch of claim 1, further comprising:
a rotating shaft connecting to the rotating device and the wear-resistant plate.

6. The glue dispenser dispensing switch of claim 1, further comprising:
a positioning device equipped in the switching device main body to position the needle holding base.

7. The glue dispenser dispensing switch of claim 1, wherein the wear-resistant plate comprises a Teflon wear-resistant plate.

8. A double liquid dispensing equipment, comprising:
a glue dispenser dispensing switch, wherein the glue dispenser dispensing switch comprises:
a switching device main body equipped with a double liquid inlet;
a needle holding base equipped with a mixed glue outlet;
a wear-resistant plate installed between the switching device main body and the needle holding base, the wear-resistant plate equipped with a wear-resistant plate opening; and
a rotating device configured to rotate the needle holding base or the wear-resistant plate, wherein a mixed double-liquid glue is passed through the double liquid inlet, the wear-resistant plate opening and the mixed glue outlet to dispense the mixed double-liquid glue when the double liquid inlet, the mixed glue outlet and the wear-resistant plate opening are overlapped; and
a mixing tube connecting to the double liquid inlet of the glue dispenser dispensing switch.

9. The double liquid dispensing equipment of claim 8, wherein the glue dispenser dispensing switch further comprises:
a needle configured to install on the mixed glue outlet of the needle holding base.

10. The double liquid dispensing equipment of claim 8, wherein the glue dispenser dispensing switch further comprises:
a rotating shaft connecting to the rotating device and the needle holding base.

11. The double liquid dispensing equipment of claim 8, wherein the glue dispenser dispensing switch further comprises:
a rotating shaft connecting to the rotating device, the wear-resistant plate and the needle holding base.

12. The double liquid dispensing equipment of claim 8, wherein the glue dispenser dispensing switch further comprises:
a rotating shaft connecting to the rotating device and the wear-resistant plate.

13. The double liquid dispensing equipment of claim 8, wherein the glue dispenser dispensing switch further comprises:
a positioning device equipped in the switching device main body to position the needle holding base.

14. The double liquid dispensing equipment of claim 8, wherein the wear-resistant plate comprises a Teflon wear-resistant plate.

15. The double liquid dispensing equipment of claim 8, further comprising a double liquid valve connecting to the mixing tube.

16. The double liquid dispensing equipment of claim 15, wherein the double liquid valve comprises a first liquid supply valve and a second liquid supply valve.

* * * * *